United States Patent [19]

Chaillié et al.

[11] 4,413,336
[45] Nov. 1, 1983

[54] PROCESS FOR TRANSMITTING DATA WITH THE AID OF A START-STOP SIGNAL

[75] Inventors: Charles Chaillié, Olching; Konrad Reisinger, Zorneding, both of Fed. Rep. of Germany

[73] Assignee: Siemens Aktiengesellschaft, Berlin & Munich, Fed. Rep. of Germany

[21] Appl. No.: 209,316

[22] Filed: Nov. 24, 1980

[30] Foreign Application Priority Data

Dec. 21, 1979 [DE] Fed. Rep. of Germany ....... 2951914

[51] Int. Cl.³ .............................................. H04J 3/06
[52] U.S. Cl. ..................................... 370/48; 370/105; 370/106
[58] Field of Search ....................... 370/43, 48, 41, 49, 370/105, 106

[56] References Cited

U.S. PATENT DOCUMENTS

| | | | |
|---|---|---|---|
| 3,387,086 | 6/1968 | Beresin | 370/43 |
| 3,396,239 | 8/1968 | Yamauchi | 370/48 |
| 3,475,559 | 10/1969 | Ringelhaan | 370/105 |
| 4,101,732 | 7/1978 | Suzuki | 370/48 |
| 4,132,867 | 1/1979 | Siglow | 370/105 |
| 4,347,606 | 8/1982 | Hoogeveen | 370/105 |

*Primary Examiner*—Gerald L. Brigance
*Attorney, Agent, or Firm*—Hill, Van Santen, Steadman & Simpson

[57] ABSTRACT

A process for the transmission of data from a plurality of data sources utilizes a start-stop signal whose signal frame contains one code bit and data bits from a plurality of data sources between a start bit and a stop bit. Here, the code bits indicate the assignment of the data bits to the individual data sources.

4 Claims, 3 Drawing Figures

PROCESS FOR TRANSMITTING DATA WITH THE AID OF A START-STOP SIGNAL

BACKGROUND OF THE INVENTION

1. Field of the Invention

The present invention relates to a process for transmitting data with the aid of a start-stop signal whose signal frame contains one start bit, one or more stop bits and additional bits therebetween for the transmission of the actual communication.

2. Description of the Prior Art

If items of data are to be transmitted from a plurality of data sources having relatively low bit rates and are to be conducted to a central station, it is conceivable to transmit each of these items of data via a time slot of a synchronously operated time division multiplex (TDM) link. In this case, each data source would be permanently assigned a respective time slot so that the items of data from the individual data sources arrive at the central station in a constantly uniform sequence and in an identifiable fashion. A relatively large expense would be required in this case for the fixed assignment of the individual data sources to the time slots. It would also be conceivable to assign the individual subscribers addresses and to transmit their data together with the addresses of the individual data sources. This would necessitate a relatively large outlay for the addresses of the individual data sources.

SUMMARY OF THE INVENTION

The object of the present invention is to supply the data from a plurality of data sources in a rational fashion to a central station.

This object is achieved, according to the present invention, by utilizing a start-stop signal in such a manner that a code bit is transmitted between a start bit and a stop bit in respect to each signal frame, that data bits from a plurality of data sources are transmitted at the bit locations remaining between the start bit and the stop bit, and that the code bits signal the assignment of the data bits emanating from the data sources to the bit positions of the start-stop signal.

The process of the present invention is characterized in that it permits the transmission of data in a low-cost manner and over widespread transmission links. In particular, the data bit can be transmitted with the aid of the start-stop signals via transmission links operated in accordance with signal frames which generally serve to transmit teleprinter signals. However, the start-stop signals can also be transmitted via channels of a.c. telegraphy.

In order that the transmission channels used may be particularly reliable and widespread, it is advantageous that the signal frame contain one start bit at the first bit position, one stop bit at a seventh bit position and the code bit at one of the intervening bit positions, and that the data bits from a plurality of data sources should be transmitted at the four remaining bit positions between the start bit and the stop bit.

In order to rapidly re-establish lost assignment between the data bits emanating from the data sources and the bit positions of the start-stop signal, it is advantageous that at the bit positions of the signal frames provided for the code bits there should be transmitted a periodically recurring sequence of $2^m$ code bits, of which m consecutive code bits in each case signal the assignment of the data bits to the data sources. The use of such a sequence of code bits is characterized in that simulation of an incorrect assignment—by code bits which may be subject to disturbance—is rapidly signaled by the next m undisturbed code bits.

In spite of the widespread location of the start-stop signal transmission channels, it can occur that the data bits of the data sources will need to be transmitted either only via a pulse-governed transmission link or both via a start-stop transmission link and via a pulse-governed transmission link. Under these conditions, it is advantageous for the signal frame to contain eight bit positions with one stop bit at the seventh and eighth bit positions, and that the data bits should be transmitted in the frame of the start-stop signal via a pulse-governed transmission link.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
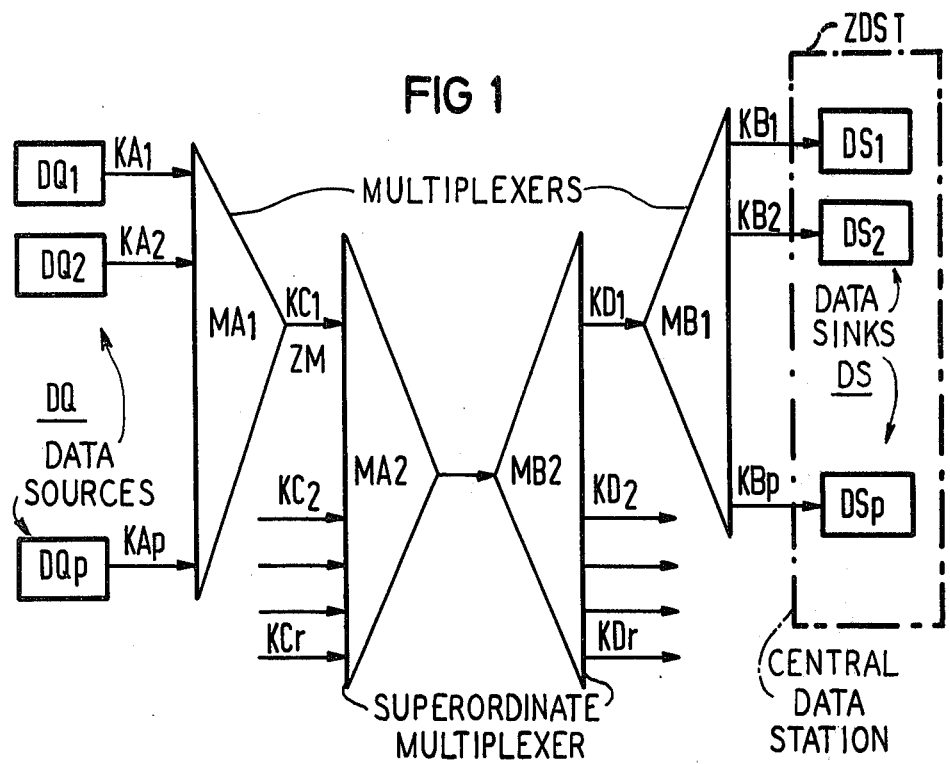
FIG. 1 is a block diagram of a TDM data transmission system.

FIG. 1 illustrates a plurality of data sources DQ1, DQ2-DQp which emit data via respective channels KA1, KA2-KAp to a multiplexer MA1. These items of data are to be conducted either to the data sinks DS1, DS2-DSp here shown in a central station ZDST.

It is conceivable to assign each of the individual data sources DQ1, DQ2-DQp one time slot of a TDM signal ZM with the aid of the multiplexer MA1 and demultiplexer MB1. This would allow the data from the data sources to be transmitted, in turn, to the data sinks and in the region of the central station ZDST each of the channels KB1-KBp would be assigned one of the data sources DQ1-DQp in reversible sequence. However, this type of system would necessitate a relatively large expense for a pulse-governed transmission link for the synchronous transmission of data from the channels KA1-KAp to the corresponding channels KB1-KBp.

It would also be conceivable to assign an address to each of the data sources DQ and to transmit the occurring data with associated addresses via the multiplexers MA1, MA2, and demultiplexers MB2, MB1 to the central station ZDST. In a system of this type, a relatively large proportion of the transmission capacity would be required for the transmission of the large number of addresses, which would reduce the efficiency of such a system.

The TDM system illustrated in FIG. 1 is based on the principle of employing cost-effective and reliable start-stop channels of the superordinate multiplexer MA2 and demultiplexer MB2 to transmit the data from the data sources DQ. In this case, the two superordinate multiplexer MA2 and demultiplexer MB2 can operate at a wide distance from one another and can be equipped with transmission devices which has not been illustrated on the drawing. The start-stop channels KC2-KCr and KD2-KDr serve to transmit teleprinter signals. These teleprinter signals can consist of one start bit, an extended stop bit, and a plurality of information bits which serve to transmit the actual communication. Here, each start-stop channel is connected to a respective single data source which comprises a teleprinter, but which has not been illustrated on the drawing. In place of the teleprinters, it would also be possible to connect other data sources which emit start-stop signals.

The start-stop channel KC1 is connected to the output of the multiplexer MA1. The TDM signal ZM emitted from the multiplexer MA1 is, in fact, in the form of a start-stop signal, but is assigned not only to one single data source, but to the data sources DQ1-DQp.

Figure 2:
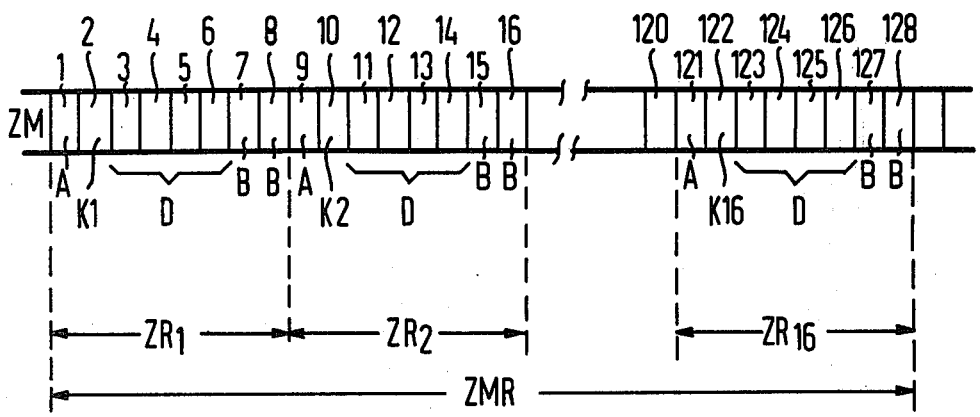
FIG. 2 illustrates a TDM signal in the form of a start-stop signal with the aid of which it is possible to transmit data bits from a plurality of data sources.

FIG. 2 illustrates details of the TDM signal ZM. Here, it has been assumed that, with p=64, a total of 64 data sources DQ have been provided whose data bits D are to be transmitted with the aid of the TDM signal ZM. The TDM signal ZM may be classified into 16 signal frames ZR1, ZR2 . . . ZR16. Together, these signal frames form the TDM frame ZMR.

The signal frames ZR1 contains a start bit A at the first bit position 1, a code bit K1 at the bit position 2, a total of four data bits D at the bit positions 3, 4, 5, 6, and a stop bit B at each of the bit positions 7 and 8. The further signal frames ZR2-ZR16 likewise each contain a start bit A, four data bits D and two stop bits B. For example, the signal frames ZR2, ZR16 contain the start bit A at the bit positions 9 and 121, respectively, the code bits K2 and K16 at the bit positions 10 and 122, respectively, and the data bits D at the bit positions 11, 12, 13, 14 and 123, 124, 125, 126, respectively, and the stop bits B at the bit positions 15, 16 and 127, 128, respectively. Therefore, the TDM signal ZM has the form of a start-stop signal.

Thus, in respect of each TDM frame, the TDM signal ZR transmits one code bit which is located between a start bit A and a stop bit B. These code bits need not be transmitted directly following the start bits A. On the basis of the signal frame ZR1, the code bit K1 could be transmitted, for example, at the bit position 5. In this case, the data bits D from the data sources would be transmitted between the bit position 1 and the bit position 7 at the remaining bit positions 2, 3, 4 and 6. Similar conditions apply to all of the signal frames ZR2-ZR16.

In the exemplary embodiment in question, it will be assumed that the bit positions 3, 4, 5, 6, 11, 12, 13, 14-123, 124, 125, 126 are each assigned in turn to the data sources DQ1-DQp, where p=64. The function of the code bits K1-K16 is to signal this assignment in the region of the central data station ZDST. The code bit K1 could, for example, have the binary value "1", and the code bits K2-K16 could each assume the binary value "0". It could thus be deduced at the central station ZDST that the data bit from the data source DQ1 appears directly following the code bit K1=1 at the bit position 3 and that the data bits from the other data sources DQ2-DQp are received at the other bit positions 4, 5 . . . . Therefore, the assignment of the individual data sources to the bit positions of the start-stop signal could be fundamentally signaled in this manner.

A different procedure is adopted in the exemplary embodiment in question. A sequence of 16 periodically recurring code bits K1-K16 is used, of which four in each case signal the associated signal frame and those four bit positions which transmit the data bits D from four data sources. For example, the sequence of the code bits K1-K16 can comprise the sequence 1101011110010000. This sequence of code bits is assigned to the signal frames ZR1-ZR16. The same sequence of code bits is also assigned in a periodic fashion to the following 16 signal frames. Four code bits of the quoted sequence in each case characterize a special character frame. For example, the code bits 0000 could signal the signal frame ZR1 and the code bits 0001 could signal the signal frame ZR2. Expressed in somewhat general terms, at those bit positions of the signal frames provided for the code bits there is transmitted a periodically recurring sequence of $2^m$ code bits of which m consecutive code bits in each case signal the assignment of the following bit positions to the data sources. In the present case where m=4 four code bits in each case characterize the signal frames. If one of these four code bits is received in disturbed form an incorrect assignment is simulated. However, this is corrected extremely rapidly by the next four correctly received code bits. The signaling of the assignment which is being described therefore proves to be extremely stable vis-a-vis disturbed code bits. In the frame of a start-stop signal it would be permissible to transmit extended stop elements at the bit positions 7, 15, . . . 127 so that the bit positions 8, 16, . . . 128 each use only a fraction of one bit duration. However, in many cases it is advantageous for all bits of the TDM signal ZM illustrated in FIG. 2 to possess the same bit duration, since a TDM signal ZM of this kind can be transmitted not only across start-stop channels, but also across pulse-governed transmission links.

Specific relationships exist between the number p of data sources DQ and the number of bits of the TDM signal ZM transmitted per time unit. It will be assumed that with the TDM signal ZM n bits can be transmitted per second. The number n is referred to as telegraphic speed and is quoted in baud. For example, when n=50 the channel in question can be a 50 Bd channel. Per signal frame, s=8 bits are transmitted and n/s signals are transmitted per second. In the exemplary embodiment, each signal contains u=4 data bits. This n times u/s data bits D are transmitted each second with the aid of the TDM signal ZM. When n=50, s=8, and u=4, the data from 50×4/8=25 data sources are transmitted each second with the aid of the TDM signal ZM. This is subject to the condition that all the data sources should emit their data at the same telegraphic speed and that one data bit D is transmitted consecutively in respect of each data source in the frame of the TDM signal ZM.

Figure 3:
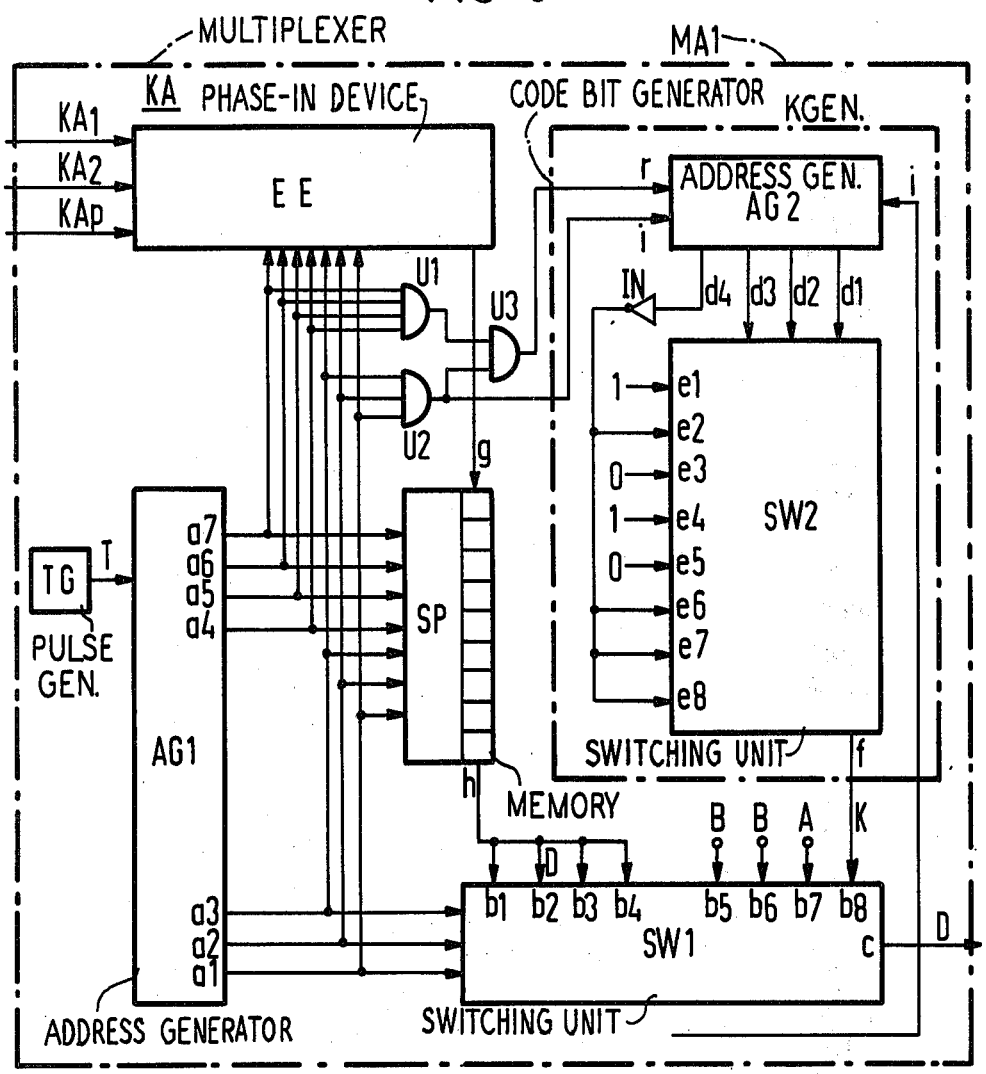
FIG. 3 is a block circuit diagram of a multiplex circuit with the aid of which the TDM signal is produced in the form of the start-stop signal.

FIG. 3 illustrates an exemplary embodiment of the multiplexer MA1. A pulse generator TG produces a bit pulse train T which is fed to an address generator AG1. The address generator AG1 produces the addresses assigned to the data sources DQ; therefore, in this exemplary embodiment, it produces 64 addresses which are formed from the bits a1, a2, a3, a4, a5, a6, a7.

The items of data supplied from the data sources DQ are fed via the channels KA to a phasing-in device EE which, for the duration of the TDM frame illustrated in FIG. 2, emits one bit in respect of each data source to a memory SP. The phasing-in device EE is known per se to those skilled in the art and is matched to the data emitted from the data sources. For example, it may be assumed that the items of data from the data sources are well emitted with the same bit rate and that the bits from the data sources lie within one and the same bit pattern. However, it would also be conceivable for the bit patterns of the individual data sources to be displaced in phase relative to one another. It is also conceivable for the phasing-in device EE to emit timing pulses to the individual data sources DQ and thus to call up the data from these data sources.

The memory SP is addressed with the addresses of the address generator AG1 and possesses a number of storage cells equal to the number of data sources. Each of the storage cells stores one data bit D which is assigned to one of the data sources. Therefore, in this exemplary embodiment, 64 storage cells are provided. When a write-in command occurs, the data bit of the addressed data source is transferred via an input g into the memory SP, and when a read-out command occurs, a data bit from the addressed storage cell is emitted by way of an output h.

A switching unit SW1 is controlled by the bits a1, a2 and a3 and in each case connects one of the inputs b1-b8 to an output c; this is illustrated in detail below in TABLE I. For example, when a3, a2, a1=001, the input b1 is connected to the output c. It will be assumed that during the bit positions 3, 4, 5, 6 illustrated in FIG. 2, the addresses 001, 010, 011, 100 are called consecutively and the inputs b1, b2, b3, b4 are connected to the output c. In this manner, a total of 4 bits from the data sources DQ are inserted into the TDM signal ZM. The stop bits B are continuously present at the inputs b5 and b6. In the event of the call-up of the addresses a3, a2, a1=101 and 110, the stop bits B are emitted from the output c via the inputs b5 and b6, respectively. The start bit A is continuously present at the input b7. In the event of the call-up of the address a3, a2, a1=111, the start bit A is emitted from the output C via the input B7. Following the start bits A, code bits K are inserted into the TDM signal ZM. These code bits K are present at the input b8 and are forwarded to the output c in response to the address a3, a2, a1=000.

TABLE I

| a3 | a2 | a1 | c  |
|----|----|----|----|
| 0  | 0  | 1  | b1 |
| 0  | 1  | 0  | b2 |
| 0  | 1  | 1  | b3 |
| 1  | 0  | 0  | b4 |
| 1  | 0  | 1  | b5 |
| 1  | 1  | 0  | b6 |
| 1  | 1  | 1  | b7 |
| 0  | 0  | 0  | b8 |

As the addresses a3, a2, a1 are produced periodically, the switching unit SW1 periodically emits four data bits D, two stop bits B, one start bit A and one code bit K. Here, the individual data bits D are assigned consecutively to different data sources. For the duration of the TDM frame ZMR illustrated in FIG. 2, however, all the 64 bits of the 64 data sources are inserted into the TDM signal D. All in all, the TDM frame ZMR contains 128 bits, because in addition to the data bits D, the start bits A, the stop bits B and the code bits K occur within the TDM frame. The code bits K are produced by a code bit generator KGEN which comprises an address generator AG2, an inverter IN and a switching unit SW2. The address generator AG2 can comprise a binary counter which is supplied with a counting pulse by way of an AND gate U2 and by way of an input I whenever the address a3, a2, a1=111 occurs. The address generator AG2 emits the addresses d4, d3, d2, d1 which are also listed below in TABLE II. The TABLE II also illustrates the sequence of code bits K which are to be produced.

TABLE II

| d4 | d3 | d2 | d1 | f  | K       |
|----|----|----|----|----|---------|
| 0  | 0  | 0  | 1  | e1 | K1 = 1  |
| 0  | 0  | 1  | 0  | e2 | K2 = 1  |
| 0  | 0  | 1  | 1  | e3 | K3 = 0  |
| 0  | 1  | 0  | 0  | e4 | K4 = 1  |
| 0  | 1  | 0  | 1  | e5 | K5 = 0  |
| 0  | 1  | 1  | 0  | e6 | K6 = 1  |
| 0  | 1  | 1  | 1  | e7 | K7 = 1  |
| 0  | 0  | 0  | 0  | e8 | K8 = 1  |
| 1  | 0  | 0  | 1  | e1 | K9 = 1  |
| 1  | 0  | 1  | 0  | e2 | K10 = 0 |
| 1  | 0  | 1  | 1  | e3 | K11 = 0 |
| 1  | 1  | 0  | 0  | e4 | K12 = 1 |
| 1  | 1  | 0  | 1  | e5 | K13 = 0 |
| 1  | 1  | 1  | 0  | e6 | K14 = 0 |
| 1  | 1  | 1  | 1  | e7 | K15 = 0 |
| 1  | 0  | 0  | 0  | e8 | K16 = 0 |

In dependence upon the addresses d3, d2, d1, the switching unit SW2 consecutively connects its inputs e1-e8 to its output f. A signal generator which emits a sigal corresponding to a "1" value is permanently connected to the inputs e1 and e4 and a signal generator which emits a signal corresponding to a "0" value is permanently connected to the inputs e3 and e5. The binary values d4 which have been inverted by the inverter IN are present at the inputs e2, e6, e7, and e8. The code bits K1 and K9 are emitted whenever the address d3, d2, d1=001, and the input e1 is connected to the output f. The code bits K2 and K10 are emitted whenever the address d3, d2, d1=010 occurs and the input e2 is connected to the output f. When d4=0 and when d4=1, the correspondingly inverted binary values "1" and "0" of the code bits K2 and K10 respectively occur. The code bits K3, K11 and K5, K13 are emitted via the inputs a3 and a5 when the addresses 011 and 101 respectively are called up. The code bits K4 and K12 are emitted when the addresses 100 are called up. The code bits K6, K14 and K7, K15 and K8, K16 are emitted when the addresses 110 and 111 and 000, respectively, are called up. The address generator AG2 is reset with the aid of the AND gates U1, U2 and U3 whenever the address generator AG1 emits the address a7, a6, a5, a4, a3, a2, a1=1111111. A signal corresponding to this address is emitted via the output of the AND gate U3 to the reset input r of the address generator AG2.

In the exemplary embodiment described with reference to FIG. 3, it has been assumed that the data sources emit their data all at the same bit rate per second. It would be fundamentally conceivable to provide data sources whose data are emitted at different bit rates. For example, it would be conceivable that of a total of 63 data sources the first data source emits its data at twice the speed and twice the bit rate in comparison to the other data sources. In this case, within the TDM frame ZMR illustrated in FIG. 2, two time slots could be reserved for the data of the first data source, while all the other data sources are assigned a respective single time slot. The phasing-in device EE illustrated in FIG. 3 would again supply 64 bits per TDM frame in the known manner in which case the address generator AG1 would emit the address of the first data source twice in respect of each TDM frame.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A process for transmitting data from a plurality of groups of data sources as a time-division multiplex signal which is divided into time-division multiplex frame each encompassing a plurality of character frames, comprising the steps of:

forming a respective character frame for each group of data sources by transmitting a frame start bit, transmitting at least one frame stop bit time-spaced from the frame start bit by a plurality of bit positions, transmitting data bits from respective data sources of a group in some of the bit positions between the frame start bit and the frame stop bit, and transmitting a code bit in a bit position between the start and stop bits to identify, with a plurality of successive code bits which is smaller in number than the number of character frames of a time-division multiplex frames, the individual character frames and the assignment of the data bits from the data sources to the respective bit locations of the character frame; and forming the time-division multiplex frame by sequentially transmitting the character frames.

2. The process of claim 1, and further defined, for a seven bit character frame, as:

transmitting the start and stop bits in the first and seventh bit positions, respectively;

transmitting the code bit in one of the bit positions two through six; and transmitting data bits in the four remaining bit positions.

3. The process of claim 1, and further defined as:

producing a periodically recurring sequence of $2^m$ code bits for indicating the assignment of the respective data bits to the respective data source, where m is the $\log^2$ of the character frames per time-division multiplex frame.

4. The process of claim 1, and further defined for an eight bit signal frame, as:

transmitting the start bit in the first bit position and two stop bits in the seventh and eighth bit positions;

transmitting the code bit in one of the bit positions two through six; and transmitting data bits in the four remaining bit positions.

* * * * *